US005639825A

United States Patent [19]
Nanbu et al.

[11] Patent Number: 5,639,825
[45] Date of Patent: *Jun. 17, 1997

[54] THERMOSETTING SILICON-CONTAINING COMPOSITION

[75] Inventors: Toshiro Nanbu; Hirotoshi Kawaguchi; Hisao Furukawa; Yasushi Kato, all of Kobe, Japan

[73] Assignee: Kanegafuchi Kagaku Kogyo Kabushiki Kaisha, Osaka, Japan

[*] Notice: The term of this patent shall not extend beyond the expiration date of Pat. No. 5,344,880.

[21] Appl. No.: 317,777

[22] Filed: Oct. 4, 1994

Related U.S. Application Data

[63] Continuation of Ser. No. 947,957, Sep. 21, 1992, abandoned, which is a continuation of Ser. No. 582,841, Oct. 9, 1990, abandoned.

[30] Foreign Application Priority Data

Feb. 10, 1989 [JP] Japan ......................................... 1-32480

[51] Int. Cl.$^6$ ................................................. C08F 230/08
[52] U.S. Cl. ................... 525/100; 525/288; 525/193; 525/104; 525/116; 525/127; 525/169; 525/185; 525/446; 525/453; 525/454; 525/476; 525/474; 525/479; 525/326.5; 525/342
[58] Field of Search ..................... 525/100, 288, 525/193, 104, 116, 127, 169, 185, 446, 453, 454, 476, 474, 479, 326.5, 342

[56] References Cited

U.S. PATENT DOCUMENTS

| | | | |
|---|---|---|---|
| 3,650,813 | 3/1972 | Nordstrom | 525/100 |
| 4,093,673 | 6/1978 | Chang et al. | 525/100 |
| 4,181,687 | 1/1980 | Ward et al. | 525/100 |
| 4,224,211 | 9/1980 | Kanazawa et al. | 260/31.2 R |
| 4,310,640 | 1/1982 | Kato et al. | 525/100 |
| 4,371,664 | 2/1983 | Kato et al. | 525/100 |
| 4,446,292 | 5/1984 | Chang et al. | 528/29 |
| 4,613,451 | 9/1986 | Chang et al. | 252/182 |
| 4,684,697 | 8/1987 | Chang et al. | 525/100 |
| 4,714,738 | 12/1987 | Chang et al. | 525/58 |
| 4,788,254 | 11/1988 | Kawakubo et al. | 525/100 |
| 4,918,140 | 4/1990 | Peccoux et al. | 525/100 |
| 4,960,809 | 10/1990 | Yamaya et al. | 524/188 |
| 4,975,488 | 12/1990 | Furukawa et al. | 525/100 |
| 5,025,049 | 6/1991 | Takarada et al. | 524/91 |
| 5,066,720 | 11/1991 | Ohsugi et al. | 525/100 |
| 5,109,064 | 4/1992 | Wakabayashi et al. | 525/100 |
| 5,344,880 | 9/1994 | Nambu et al. | 525/100 |
| 5,399,607 | 3/1995 | Nanbu et al. | 524/385 |

FOREIGN PATENT DOCUMENTS

| | | |
|---|---|---|
| 0 318 880 | 6/1989 | European Pat. Off. . |
| 58-111855 | 7/1983 | Japan . |

OTHER PUBLICATIONS

Martens "Technology of Paints, Varnishes and Lacquers" 1968. pp. 111–131.
*Technology of Paints, Varnishes and Lacquers*, Martens, ed. 1968 pp. 111–131.

*Primary Examiner*—Margaret Glass
*Attorney, Agent, or Firm*—Armstrong, Westerman, Hattori, McLeland & Naughton

[57] ABSTRACT

When a thermosetting composition comprising (A) a resin having hydroxyl group, (B) a hydrolyzable silyl group-containing polymer, (C) a hydrolyzable silicon compound and (D) a curing catalyst is used, coating materials having no problem as to bad-smelling can be obtained and the coating films formed therefrom are improved in physical properties such as adhesion, solvent resistance and hardness.

15 Claims, No Drawings

THERMOSETTING SILICON-CONTAINING COMPOSITION

This application is a continuation of application Ser. No. 07/947,957 filed Sep. 21, 1992, now abandoned, which was a continuation of application Ser. No. 07/582,841, filed Oct. 9, 1990, now abandoned.

TECHNICAL FIELD

The present invention relates to a thermosetting composition which is used for various coatings for outer walls of buildings, automobiles, industrial machines, steel furnitures, household electric appliances, plastics, and the like, especially, coatings required to have an excellent durability.

BACKGROUND ART

Conventional thermosetting coatings are ones wherein a melamine is used as a crosslinking agent such as an alkyd melamine, an acrylic melamine or an epoxy melamine. The problem of odor caused by the melamine resins remains to be solved.

As coatings having no such a problem, there has been proposed (1) a paint using a polyol resin and a hydrolyzable silyl group-containing resin, (2) a paint using a polyol resin and a hydrolyzable silicon compound, (3) a paint using a hydrolyzable silyl group-containing resin and a hydrolyzable silicon compound, and the like, and it has been shown that they are additionally improved in coating film hardness, solvent resistance of the coating film, and the like.

These paints do not have the problem of the bad odor which the melamines have, however, an another problem that they have is their film properties are not necessarily sufficient.

In view of the circumstances, in order to obtain coating materials which do not have the problem of bad odor and which have excellent coating film properties, the present inventors have repeated earnest studies. As a result, they have found that coating film properties can be improved by further adding a hydrolyzable silicon compound to a mixture of a resin having hydroxyl group and a hydrolyzable silyl group-containing polymer, and have accomplished the present invention.

DISCLOSURE OF THE INVENTION

The present invention relates to a thermosetting composition comprising:
(A) a resin having a hydroxyl group,
(B) a hydrolyzable silyl group-containing polymer,
(C) a hydrolyzable silicon compound and
(D) a curing catalyst.

As the resin having hydroxyl group used in the present invention which is the component (A) (hereinafter referred to as "resin (A) having hydroxyl group"), there are exemplified an alkyd resin having an oil length of not more than 50% or oil free alkyd resin, an acrylic modified alkyd resin, a hydroxyl group-containing acrylic resin, an epoxy resin, a hydroxyl group-containing fluorocarbon resin, which have hitherto been used as the thermosetting paint, a polyesterpolyol, a polyetherpolyol, a polyurethane-polyol, a hydroxy group-containing cellulose compound, and the like, and the resins are not limited thereto. Such resins (A) having hydroxyl group can be prepared in a manner which has hitherto been known.

The molecular weight and the hydroxyl value of the resin (A) having hydroxyl group are not particularly limited, and resins usually used can be used. It is preferable that the number average molecular weight is from 1,500 to 40,000 from the viewpoints of the physical properties of the coating film obtained from the composition of the present invention. Also, it is preferable that the hydroxyl value is from 10 to 150 mgKOH/g from the viewpoints of the coating film physical properties. The resin (A) having hydroxyl group may be used alone or as an admixture thereof.

The hydrolyzable silyl group-containing polymer used in the present invention which is the component (B) (hereinafter referred to as "hydrolyzable silyl group-containing polymer (B)") is a silyl group-containing polymer having in one molecule at the molecular ends or side chains at least one, preferably not less than two, silicon atoms to which a hydrolyzable group is attached. When the number of the hydrolyzable silyl group is less than one in one molecule, it is easy to lower the solvent resistance which is the physical property of the coating film of the composition of the present invention. Examples of the above-mentioned hydrolyzable groups are, for instance, an alkoxy group, a hydroxy group, an acyloxy group, an aminoxy group, a phenoxy group, a thioalkoxy group, an amino group, and the like. The alkoxy group is the most preferable from the viewpoint of the coating film physical properties of the composition of the present invention. It is preferable that the number average molecular weight of the hydrolyzable silyl group-containing polymer (B) is from 1,000 to 30,000 from the viewpoints of the coating film physical properties of the composition of the invention.

Concrete examples of the hydrolyzable silyl group-containing polymer (B) are a hydrolyzable silyl group-containing vinyl polymer whose main chain is substantially composed of polyvinyl bondings, a hydrolyzable silyl group-containing polyester polymer whose main chain is substantially composed of polyester bondings, a hydrolyzable silyl group-containing polyether polymer whose main chain is substantially composed of polyether bondings, furthermore, graft polymers or block polymers obtained by using them, and the polymers are not limited thereto. Among them, the hydrolyzable silyl group-containing vinyl polymers are particularly preferable from the viewpoint of the weatherability.

The above-mentioned hydrolyzable silyl group-containing vinyl polymers can be obtained by, for instance, the copolymerization of a vinyl monomer with a hydrolyzable silyl group-containing monomer. The polymer may have a urethane bond or a siloxane bond in its main chain or side chains in part.

The above-mentioned vinyl monomers are not particularly limited. Examples of the vinyl monomers are, for instance, an unsaturated carboxylic acid ester such as methyl (meth)acrylate, ethyl (meth)acrylate, butyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, a diester or half ester of a polycarboxylic acid (maleic acid, fumaric acid, itaconic acid, and the like) with a linear or branched alcohol having 1 to 20 carbon atoms; an aromatic hydrocarbon vinyl compound such as styrene, α-methylstyrene, chlorostyrene, styrenesulfonic acid, 4-hydroxystyrene or vinyl toluene; a vinyl ester or an allyl compound such as vinyl acetate, vinyl propionate or diallyl phthalate; a nitrile group-containing vinyl compound such as (meth)acrylonitrile; an epoxy group-containing vinyl compound such as glycidyl (meth)acrylate; an amino group-containing vinyl compound such as dimethylaminoethyl (meth)acrylate, dimethylaminoethyl (meth)acrylate, vinylpyridine, aminoethyl vinyl ether; an amido group-containing vinyl compound such as (meth)acrylamide, iraconic diamide, α-ethyl (meth)acrylamide, crotone amide, malediamide, fumardiamide, N-vinyl pyrrolidone, N-butoxymethyl (meth) acrylamide, N,N-dimethylacrylamide, N-methylacrylamide or acryloyl morpholine; a hydroxy group-containing vinyl compound such as 2-hydroxyethyl (meth)acrylate, 2-hydroxypropyl (meth)acrylate, 2-hydroxyethyl vinyl ether, N-methylol(meth)acrylamide, or Aronix 5700 made by Toagosei Chemical industry Co., Ltd., Placcel FA-1, Placcel FA-4, Placcel FM-1 or Placcel FM-4 made by Daicel Chemical Industries, Ltd.; an unsaturated carboxylic acid such as (meth)acrylic acid, maleic acid, fumaric acid or iraconic acid, their salts (an alkali metal salt, an ammonium salt, an amine salt, and the like) or their acid anhydrides (maleic anhydride); an other vinyl compound such as vinyl methyl ether, vinyl chloride, vinylidene chloride, chloroprene, propylene, butadiene, isoprene, maleimide, N-vinylimidazole or vinylsulfonic acid; and the like.

The above-mentioned hydrolyzable silyl group-containing monomers are not particularly limited so long as the monomer has the hydrolyzable silyl group. Typical examples of the monomers are, for instance,

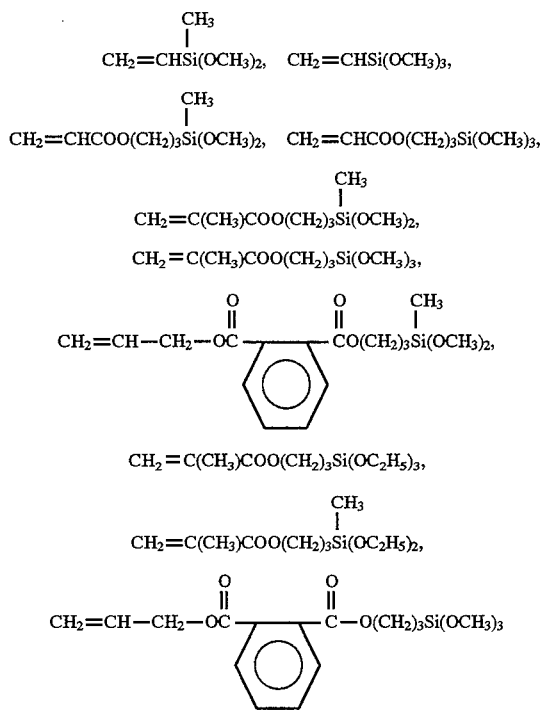

A percentage of the hydrolyzable silyl group-containing monomer units in the hydrolyzable silyl group-containing vinyl polymer (B) is preferably from 5 to 90% (% by weight, hereinafter the same), more preferably from 11 to 70%.

The hydrolyzable silyl group-containing vinyl polymer can be prepared, for instance, in a manner as described in Japanese Unexamined Patent Publications No. 36395/1979, No. 36109/1982, No 157810/1983 and the like. It is the most preferable to prepare in a solution polymerization using an azo radical initiator such as azobisisobutyronitrile from the viewpoint of the easiness of synthesis.

If necessary, in the above-mentioned solution polymerization, the molecular weight can be controlled by using a chain transfer agent such as n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3)_3Si-S-S-Si-(OCH_3)_3$ or $(CH_3O)_3Si-S_8-Si(OCH_3)_3$. Particularly, when using a chain transfer agent having a hydrolyzable silyl group in its molecule, such as γ-mercaptopropyltrimethoxysilane, it is possible to introduce the hydrolyzable silyl group into the polymer ends of the silyl group-containing vinyl copolymer.

Polymerization solvents used in the above-mentioned solution polymerization are not particularly limited so long as the solvents are non-reactive solvents such as hydrocarbons (toluene, xylene, n-hexane, cyclohexane and the like), acetic esters (ethyl acetate, butyl acetate and the like), alcohols (methanol, ethanol, isopropanol, n-butanol and the like), ethers (ethyl cellosolve, butyl cellosolve, cellosolve acetate and the like), and ketones (methyl ethyl ketone, ethyl acetoacetate, acetylacetone, diacetone alcohol, methyl isobutyl ketone, acetone and the like).

The hydrolyzable silyl group-containing polymer (B) may be used alone or as an admixture thereof.

The amount used of the hydrolyzable silyl group-containing polymer (B) is not particularly limited. It is preferable that the component (A)/the compound (B) is from 9/1 to 1/9 in weight ratio, more preferably from 8/2 to 2/8. When (A)/(B) is more than 9/1, it tends to lower the water resistance, the coating film physical property of the composition of the present invention, and when (A)/(B) is less than 1/9, there is a tendency that the characteristics obtained by blending the component (A) are unsatisfactorily obtained.

The hydrolyzable silicon compound used in the present invention which is the component (C) (hereinafter referred to as "hydrolyzable silicon compound (C)") is a compound having a hydrolyzable silyl group at the molecular end or side chain, and is a component used for improving adhesion, hardness and solvent resistance of coating films obtained from the thermosetting composition comprising the resin (A) having hydroxyl group, the hydrolyzable silyl group-containing polymer (B) and the curing catalyst (D) mentioned below.

Preferable examples of the hydrolyzable silicon compound (C) are, for instance, hydrolyzable silane compounds, their condensation products, their reaction products, mixtures thereof, and the like.

Concrete examples of the above-mentioned hydrolyzable silane compounds are, for instance, methyl silicate, methyltrimethoxysilane, ethyltrimethoxysilane, butyltrimethoxysilane, octyltrimethoxysilane, dodecyltrimethoxysilane, phenyltrimethoxysilane, vinyltrimethoxysilane, γ-methacryloyloxypropyltrimethoxysilane, γ-acryloyloxypropyltrimethoxysilane, γ-glycidoxypropyltrimethoxysilane, γ-mercaptopropyltrimethoxysilane, γ-aminopropyltrimethoxysilane, N-β-aminoethyl-γ-propyltrimethoxysilane, dimethyldimethoxysilane, diethyldimethoxysilane, dibutyldimethoxysilane, diphenyldimethoxysilane, vinylmethyldimethoxysilane, γ-methacryloyloxypropylmethyldimethoxysilane, trimethylmethoxysilane, triethylmethoxysilane, triphenylmethoxysilane, ethyl silicate, methyltriethoxysilane, ethyltriethoxysilane, butyltriethoxysilane, octyltriethoxysilane, dodecyltriethoxysilane, phenyltriethoxysilane, vinyltriethoxysilane, γ-methacryloyloxypropyltriethoxysilane, γ-acryloyloxypropyltriethoxysilane, γ-glycidoxypropyltriethoxysilane, γ-mercaptopropyltriethoxysilane, γ-aminopropyltriethoxysilane, N-β-aminoethyl-γ-propyltriethoxysilane, dimethyldiethoxysilane, diethyldiethoxysilane, dibutyldiethoxysilane, diphenyldiethoxysilane, vinylmethyldiethoxysilane, γ-methacryloyloxypropylmethyldiethoxysilane, trimethylethoxysilane, triethylethoxysilane, triphenylmethoxysilane, and the like.

Also, the partially hydrolyzed condensate of the above-mentioned hydrolyzable silane compound can be easily obtained by progress of the condensation of the above-mentioned silane compound or the admixture thereof, adding a necessary amount of $H_2O$, also adding, as occasion demands, a small amount of a condensation catalyst such as hydrochloric acid or sulfuric acid at a temperature of ordinary temperature to 100° C. while removing a generated alcohol.

As a partially hydrolyzed condensate of methyl silicate which has methoxysilyl group, there are exemplified, for instance, Methyl Silicate 47, Methyl Silicate 51, Methyl Silicate 55, Methyl Silicate 58, Methyl Silicate 60, which are made by NIPPON COLCOAT Kabushiki Kaisha, and the like. Also, as a partially hydrolyzed condensate of methyltrimethoxysilane or dimethyldimethoxysilane which has methoxysilyl group, there are exemplified AFP-1, AFP-2, AFP-6, KR213, KR217, KR9218, which are made by Shin-Etsu Chemical Co., Ltd.; TSR165, TR3357, which are made by Toshiba Silicone Co., Ltd., Y-1587, FZ-3701, FZ-3704, which are made by Nippon Unicar Kabushiki Kaisha and the like. Also, as a partially hydrolyzed condensate of ethyl silicate which has ethoxysilyl group, there are exemplified Ethyl Silicate 40 which is made by NIPPON COLCOAT Kabushiki Kaisha, HAS-1, HAS-6, HAS-10, and the like.

As the reaction product of the above-mentioned hydrolyzable silane compound, there are exemplified, for instance, reaction products of a silane coupling agent having amino group and a sitane coupling agent having epoxy group; reaction products of a silane coupling agent having amino group and ethylene oxide, butylene oxide, epichlorohydrin, epoxidated soybean oil, and other compounds having epoxy group such as Epicoat 828 or Epicoat 1001, made by Yuka Shell Epoxy Kabushiki Kaisha; reaction products of a silane coupling agent having epoxy group and an amine, for instance, an aliphatic amine such as ethyl amine, diethyl amine, triethyl amine, ethylene diamine, hexane diamine, diethylene triamine, triethylene tetramine or tetraethylene pentamine, an aromatic amine such as aniline or diphenyl amine, an alicyclic amine such as cyclopentyl amine or cyclohexyl amine, ethanol amines; and the like.

The hydrolyzable silicon compound (C) may be used alone or as an admixture thereof.

The used amount of the hydrolyzable silicon compound (C) is not particularly limited. Generally the amount is from 0.01 to 100 parts (part by weight, hereinafter the same), preferably from 0.1 to 30 parts, based on 100 parts of the solid matter of the component (A) and the component (B). When the used amount of the component (C) is less than 0.01 part, the addition effect can be unsufficiently obtained. When the amount is more than 100 parts, it tends to lower the coating film properties of the composition of the present invention.

Examples of the curing catalyst used in the present invention which is the component (D) (hereinafter referred to as "curing catalyst (D)") are, for instance, organotin compounds such as dibutyl tin dilaurate, dibutyl tin dimaleate, dioctyl tin dilaurate, dioctyl tin dimaleate and tin octoate; phosphoric acid or phosphates such as monomethyl phosphate, monoethyl phosphate, monobutyl phosphate, monooctyl phosphate, monodecyl phosphate, dimethyl phosphate, diethyl phosphate, dibutyl phosphate, dioctyl phosphate and didecyl phosphate; addition reaction products of phosphoric acid and(or) mono-acid phosphate with an epoxy compound such as propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyldimethoxysilane,

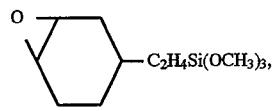

Cardula E made by Yuka Schell Epoxy Kabushiki Kaisha, or Epicote 828 or Epicore 1001 made by Yuka Shell Epoxy Kabushiki Kaisha; organic titanate compounds; organic aluminum compounds; acidic compounds such as maleic acid and p-toluenesulfonic acid; amines such as hexylamine, di-2-ethylhexylamine, N,N-dimethyldodecylamine and dodecylamine; reaction products of the amine with the acidic phosphate, alkaline compounds such as sodium hydroxide and potassium hydroxide; and the like.

Among these curing catalysts (D), the organotin compounds, the acidic phosphate, the reaction products of the acidic phosphate and the amine, the saturated or unsaturated polyvalent carboxylic acids or their acid anhydrides, the reactive silicon compounds, the organic titanate compounds, the organic aluminum compounds, and mixtures thereof have high activity, and are preferable.

The curing catalyst (D) may be used alone or as an admixture thereof.

The used amount of the component (D) is not particularly limited. The amount is usually from 0.1 to 20 parts, preferably from 0.1 to 10 parts, based on 100 parts of the solid matter of the component (A) and the component (B). When the used amount of the component (D) is less than 0.1 part, the curability tends to lower. When the amount is more than 20 parts, the coating film properties of the composition of the present invention tend to lower.

When as the component (D), the reactive silicon compound which is also used as the component (C) is used, it is preferable that the used amount is not more than 30 parts [total amount of the component (C) and the component (D)] based on the solid matter of the component (A) and the component (B).

In the composition of the present invention, a dehydrating agent may be used or not. By using the dehydrating agent, the stability maintained for a long period of time and the stability such that even if the composition is used repeatedly, no problem arises can be obtained.

Examples of the dehydrating agents are, for instance, hydrolyzable ester compounds such as methyl orthoformate, ethyl orthoformate, methyl orthoacetate, ethyl orthoacetate, methyltrimethoxysilane, γ-methacryloyloxypropyltrimethoxysilane, vinyltrimethoxysiiane, methyl silicate and ethyl silicate, and the like. These dehydrating agents may be added before, after or during the polymerization of the hydrolyzable silyl group-containing polymer (B).

The used amount of the dehydrating agent is not particularly limited. The amount is usually not more than 100 parts, preferably not more than 50 parts, based on 100 parts of the solid matter of the component (A) and the component (B).

Further, it is possible to increase the effect of the dehydrating agent by the combination with a dehydrating accelerator.

As the dehydrating accelerator, there are effective inorganic acid such as hydrochloric acid, sulfuric acid, phosphoric acid or nitric acid; an organic acid such as formic acid, acetic acid, oxalic acid, benzoic acid, phtharic acid, p-toluenesulfonic acid, acrylic acid and methacrylic acid; a metal salt of carboxylic acid such as an alkyl titanate or lead octylate; a carboxylic acid organotin compound such as tin octylate, dibutyl tin dilaurate or dioctyl tin maleate; a sulfide or mercaptide organotin compound such as monobutyl tin sulfide or dioctyl tin mercaptide; an organotin oxide such as dioctyl tin oxide; an organotin compound obtained by the reaction of the organotin oxide and an ester compound such as ethyl silicate, Ethyl Silicate 40, dimethyl maleate or dioctyl phthalate; an amine such as tetraethylenepentamine, triethylenediamine or N-β-aminoethyl-γ-aminopropyltrimethyoxysilane; an alkali catalyst such as potassium hydroxide or sodium hydroxide; and the like. Among them, the organic acids, the inorganic acids and the organotin compounds are particularly effective.

The dehydrating accelerator is used in an amount from 0.0001 to 20 parts, preferably from 0.001 to 10 parts, based on 100 parts of the dehydrating agent. When using the compound which is also used as the above-mentioned component (D) as the dehydrating accelerator, it is further used in amount of 0.1 to 20 parts, preferably from 0.1 to 10 parts, in addition to the used amount of the above-mentioned component (D).

In the composition of the present invention, a solvent may be used. As the solvent to be used, any of solvents such that both the resin (A) having hydroxyl group and the hydrolyzable silyl group-containing polymer (B) are dissolved therein or any of solvents such that no precipitate is produced when mixing the resin (A) having hydroxyl group with the hydrolyzable silyl group-containing polymer (B) are used.

Concrete examples of such solvents are, for instance, aliphatic hydrocarbons, aromatic hydrocarbons, halogenated hydrocarbons, alcohols, ketones, esters, ethers, alcoholic esters, ketone alcohols, ether alcohols, ketone ethers, ketone esters, ester ethers, which are used in usual paints or coating agents, and the like. Among them, solvents containing alkyl alcohols are particularly preferable from the viewpoint of the increase of the stability of the composition of the invention.

As the above-mentioned alkyl alcohol, alkyl alcohols having an alkyl group with 1 to 10 carbon atoms are preferable. For instance, there is used methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve, or the like. The used amount of the alcohol is not particularly limited. Usually, the amount is not more than 100 parts, preferably not more than 50 parts, based on 100 parts of the solid matter of the component (A) and the component (B).

The combination of the alcohol and the above-mentioned dehydrating agent is remarkably effective to the storage stability in case of mixing the components (A), (B) and (C) of the composition of the present invention and storing it. The amount of the solvent varies depending on the molecular weight or the composition of the components (A) and (B) used in the composition of the present invention, and it is adjusted to a practically necessary solid content or viscosity.

To the composition of the present invention may be added, according to the uses thereof, additives such as diluents, pigments (including an extender pigment), ultraviolet absorbers, light stabilizers, agents for preventing precipitation and leveling agents; celluloses such as nitrocellulose and cellulose acetate butyrate, resins such as epoxy resins, melamine resins, vinyl chloride resins, chlorinated polypropylene, chlorinated rubbers and polyvinyl butyral, fillers, and the like.

Next, the preparation method of the composition of the present invention is explained.

The preparation method is not particularly limited. For instance, the composition of the present invention is prepared in a manner wherein the component (A) is cold-blended with the component (B), or after mixing the components (A) and (B) it is heated (hot-blended) to partially react, to which the components (C) and (D) are added.

Thus obtained composition of the present invention is one wherein the crosslinking reaction that hydroxyl group of the resin (A) having hydroxyl group reacts with silyl group of the hydrolyzable silyl group-containing polymer (B) is utilized, and it is clearly distinguished from conventional techniques using a melamine as the crosslinking agent.

The composition of the present invention can be cured at a temperature of usually not less than 30° C., preferably from 55° to 350° C., after applying it to a substrate according to a usual manner such as dipping manner, spraying or brushing.

The coating films obtained from the composition of the present invention are excellent in adhesion, solvent resistance, hardness, and the like and have high durability.

BEST MODE FOR CARRYING OUT THE INVENTION

The composition of the present invention is explained by means of Preparation Examples, Examples and Comparative Examples.

Preparation Example 1

[Preparation of a hydrolyzable silyl group-containing polymer (B)]

A reactor equipped with a stirrer, a thermometer, a condenser, a nitrogen inlet tube and a dropping funnel was charged with 45.9 parts of xylene, and the reactor was heated to 110° C., introducing nitrogen gas thereto. Then, a mixture (b) as shown below was added dropwise at a uniform velocity through the dropping funnel for 5 hours.

Mixture (b)

| | |
|---|---|
| Styrene | 12.8 parts |
| Methyl methacrylate | 50.1 parts |
| Stearyl methacrylate | 6.9 parts |
| γ-Methacryloyloxypropyltrimethoxysilane | 30.2 parts |
| Xylene | 13.5 parts |
| 2,2'-Azobisisobutyronitrile | 4.5 parts |

After completing the addition of the mixture (b), 0.5 part of 2,2'-azobisisobutyronitrile and 5 parts of toluene were added dropwise at a uniform rate for 1 hour. After completing the addition, the resulting mixture was aged at 110° C. for 2 hours, then was cooled down and xylene was added to the resin solution to adjust the solid content to 60%. The properties of the obtained resin solution (1) are shown in Table 1.

Preparation Example 2

[Preparation of resin (A) having hydroxyl group]

The reactor was charged with 31.3 parts of butyl acetate and 9.5 parts of xylene instead of 45.9 parts of xylene, and a mixture (a) as shown below was added in the same manner as in Preparation Example 1.

Mixture (a)

| Xylene | 18 parts |
|---|---|
| Styrene | 28.3 parts |
| Methyl methacrylate | 7.1 parts |
| n-Butyl acrylate | 32.5 parts |
| Methacrylic acid | 0.3 parts |
| Placcel FM-1 (Note 1) | 31.8 parts |
| 2,2'-Azobisisobutyronitrile | 1.8 parts |

(Note 1) 2-Hydroxyethyl methacrylate/ε-caprolactone = 1/1 addition reaction product made by Daicel Chemical Industry Co., Ltd.

(Note 1) 2-Hydroxyethyl methacrylate/α-caprolactone= 1/1 addition reaction product made by Daicel Chemical Industry Co., Ltd.

After completing the addition of the mixture (a), 0.2 part of 2,2'-azobisisobutyronitrile and 3.8 parts of toluene were added dropwise at a uniform rate for 1 hour. After completing the addition, the resulting mixture was aged at 110° C. for 2 hours, then the mixture was cooled down. Xylene was added to the resin solution to adjust the solid content to 60%. The properties of the resin solution (2) are shown in Table 1.

TABLE 1

| | Resin solution | |
|---|---|---|
| Physical Property | (1) | (2) |
| Non-volatile matter (%) | 60 | 60 |
| Viscosity (28° C., cps) | 900 | 4,400 |
| Acid value (mgKOH/g solid) | 0 | 2.0 |
| Hydroxyl value (mgKOH/g solid) | 0 | 73 |
| Number average molecular weight | 6,000 | 10,000 |
| Color number (Gardner) | <1 | <1 |

Examples 1–3 and Comparative Example 1

To 48 g of the resin solution (1) was added 72 g of the resin solution (2), 48 g of titanium dioxide (CR 93 made by Ishihara Industry Kabushiki Kaisha), 3.6 g of methyl orthoacetate, 10 g of isopropyl alcohol, 18.4 g of xylene, and 80 g of glass beads having a particle size of 2 mm φ, and the mixture was dispersed by a paint shaker for 1 hour to give a white enamel-1.

The obtained white enamel-1, a hydrolyzable silicon compound and dibutyl tin dilaurate were mixed in amounts as shown in Table 2 to prepare a composition.

To the obtained composition was added a mixed solvent of xylene/butanol=70/30 to dilute to a coating viscosity, with which a test piece [an anti-corrosive aluminum (A-5052P made by Nippon Test Panel Kabushiki Kaisha) was degreased with xylene] was air-sprayed, and it was allowed to stand for 20 minutes and was baked at 140° C. for 20 minutes to give a film with a thickness of 30 μm. The pencil hardness, the state after 10 times xylene rubbing and the adhesion of the obtained coating film were estimated according to the following methods. The results are shown in Table 2.

(Pencil hardness)

A test and estimation are conducted according to JIS K 5400.

(State after 10 times xylene-rubbing)

An absorbent cotton is impregnated with xylene, with which each test piece is rubbed 10 times under the same condition, and the state is observed. Estimations are that ⊙ shows no damage, ○ shows a state that a few scratches are observed on the surface, Δ shows a state that the gloss a little wears out and x shows a state that there is no gloss.

[Adhesion]

According to a cross-cut test method in the manner described in JIS K 5400, the estimations are conducted as 10 shows 100/100 and 0 shows 0/100.

Comparative Example 2

To 120 g of the resin solution (2) obtained in Preparation Example 2 [resin (A) having hydroxyl group] was added 48 g of titanium dioxide (CR 93 made by Ishihara Industry Kabushiki Kaisha), 3.6 g of methyl orthoacetate, 10 g of isobutyl alcohol, 13.4 g of xylene, and 80 g of glass beads having a particle size of 2 mm φ, and the mixture was dispersed by a paint shaker for 1 hour to give a white enamel-2.

The obtained white enamel-2, a hydrolyzable silicon compound and dibutyl tin dilaurate were mixed in amounts as shown in Table 2 to prepare a composition.

In the same manner as in Example 1, the obtained composition was diluted, the test piece was air-sprayed to give a coating film and the estimations were conducted. The results are shown in Table 2.

Comparative Example 3

To 120 g of the resin solution (1) obtained in Preparation Example 1 [hydrolyzable silyl group-containing polymer (B)] was added 48 g of titanium dioxide (CR 93 made by Ishihara Industry Kabushiki Kaisha), 3.6 g of methyl orthoacetate, 10 g of isobutyl alcohol, 13.4 g of xylene, and 80 g of glass beads having a particle size of 2 mm φ, and the mixture was dispersed by a paint shaker for 1 hour to give a white enamel-3.

The obtained white enamel-3, a hydrolyzable silicon compound and dibutyl tin dilaurate were mixed in amounts as shown in Table 2 to prepare a composition.

In the same manner as in Example 1, the composition was diluted, the test piece was air-sprayed to give a coating film and the estimations were conducted. The results are shown in Table 2.

TABLE 2

| Ex. No. | 1 | 2 | 3 | Comp. Ex. 1 | Comp. Ex. 2 | Comp. Ex. 3 |
|---|---|---|---|---|---|---|
| Composition (part) | | | | | | |
| White enamel 1 | 100 | 100 | 100 | 100 | — | — |
| White enamel 2 | — | — | — | — | 100 | — |
| White enamel 3 | — | — | — | — | — | 100 |
| Hydrolyzable | | | | | | |
| silicon compound 1*1 | 0.72 | — | 0.36 | — | — | — |
| silicon compound 2*2 | — | 1.8 | — | — | — | — |
| silicon compound 3*3 | — | — | 1.8 | — | 1.8 | 1.8 |
| Dibutyl tin dilaurate | 1.4 | 1.4 | 1.4 | 1.4 | 1.4 | 1.4 |

TABLE 2-continued

| Ex. No. | 1 | 2 | 3 | Comp. Ex. 1 | Comp. Ex. 2 | Comp. Ex. 3 |
|---|---|---|---|---|---|---|
| Estimation results | | | | | | |
| Pencil hardness | H | H | 2H | F | 2B | B–HB |
| 10 times Xylene-rubbing | ⊚ | ⊚ | ⊚ | ○ | X | △ |
| Adhesion (marks) | 10 | 10 | 10 | 7 | 10 | 9 |

*¹A reaction product of an aminosilane (A-1120 made by Union Carbide Coporation) and an epoxysilane (A187 made by Union Carbide Corporation)
*²A reaction product of an epoxy resin (Epicoat 828 made by Yuka Shell Epoxy Kabushiki Kaisha) and an aminosilane (A-1100 made by Union Carbide Coporation)
*³A hydrolyzed condensate of ethyl silicate (Ethyl Silicate made by NIPPON COLCOAT Kabushiki Kaisha)

From the results of Table 2, it would be understood that the coating films using the coating materials relating to the composition of the present invention wherein the hydrolyzable silicon compound is added are improved in pencil hardness, solvent resistance shown by the state after 10 times xylene rubbing, and adhesion.

INDUSTRIAL APPLICABILITY

When using the thermosetting composition of the present invention, the coating materials having no problem as to the bad-smelling can be obtained and the coating films having improved properties such as adhesion, solvent resistance and hardness can be obtained.

We claim:
1. A thermosetting composition comprising:
(A) a hydroxyl group-containing resin having a hydroxyl value of 10 to 150 mg KOH/g and selected from the group consisting of an alkyd resin, an acrylic resin, an epoxy resin, a fluorocarbon resin, cellulose, a polyester polyol, a polyether polyol, and a polyurethane polyol;
(B) a hydrolyzable silyl group-containing polymer wherein the main chain of the polymer is at least one member of the group consisting of a vinyl polymer, a polyester polymer, a polyether polymer, and graft or block copolymer thereof:
(C) a hydrolyzable silicon compound, comprising at least one member of the group consisting of methyl silicate, ethyl silicate and partially hydrolyzed condensates thereof; and
(D) a curing catalyst,
wherein said thermosetting composition is cured by a crosslinking mechanism which comprises a crosslinking reaction between the hydroxyl group of the hydroxyl-group containing resin (A) and the hydyolyzable silyl group of the hydrolyzable silyl group-containing polymer (B).

2. The thermosetting composition of claim 1, wherein said hydroxyl group-containing resin has a number average molecular weight of 1,500 to 40,000.

3. The thermosetting composition of claim 1, wherein said hydrolyzable silyl group-containing polymer contains 5 to 90% by weight of units of an alkoxysilyl vinyl monomer including a polymerizable unsaturated double bond and an alkoxysilyl group in its molecule.

4. The thermosetting composition of claim 1, wherein said curing catalyst which is the component (D) is an organotin compound, an acidic phosphate, a reaction product of an acidic phosphate with an amine, a saturated or unsaturated polyvalent carboxylic acid, a saturated or unsaturated polyvalent carboxylic acid anhydride, a reactive silicon compound, an organic titanate compound, an organic aluminum compound or a mixture thereof.

5. The thermosetting composition of claim 1, further comprising a hydrolyzable ester compound as a dehydrating agent and an alkyl alcohol as a solvent.

6. The thermosetting composition of claim 1, wherein said hydrolyzable silyl group-containing polymer (B) has at least one hydrolyzable silyl group in one molecule so as to serve as a crosslinking agent by a reaction between the hydroxyl groups of said resin (A) and the hydrolyzable silyl groups of said polymer (B).

7. The thermosetting composition of claim 1, wherein said hydrolyzable silyl group-containing polymer (B) is a copolymer of a vinyl monomer and a hydrolyzable silyl group-containing monomer, said vinyl monomer being a member selected from the group consisting of an unsaturated carboxylic acid ester, an aromatic hydrocarbon vinyl compound, a vinyl ester, an allyl compound, a nitrile group-containing vinyl compound, an epoxy group-containing vinyl compound, an amino group-containing vinyl compound, an amido group-containing vinyl compound, an unsaturated carboxylic acid, an unsaturated carboxylic acid salt and an unsaturated carboxylic acid anhydride.

8. The thermosetting composition of claim 1, wherein the ratio of said hydroxyl group-containing resin (A) to said hydrolyzable silyl group-containing polymer (B) is from 9/1 to 1/9 by weight.

9. The thermosetting composition of claim 1, wherein said hydrolyzable silicon compound (C) is present in an amount of 0.01 to 100 parts by weight per 100 parts by weight of the total solid matter of said components (A) and (B).

10. The thermosetting composition of claim 1, wherein said hydrolyzable silicon compound (C) is present in an amount of 0.1 to 30 parts by weight per 100 part by weight of the total solid matter of said components (A) and (B).

11. The thermosetting composition of claim 1, wherein said curing catalyst (D) is present in an amount of 0.1 to 20 parts by weight per 100 parts by weight of the total solid matter of said components (A) and (B).

12. The thermosetting composition of claim 1, further comprising a hydrolyzable ester compound as a dehydrating agent and 0.0001 to 20 parts by weight, based on 100 parts by weight of said dehydrating agent, of at least one dehydrating accelerator selected from the group consisting of an inorganic acid, an organic acid, a metal salt of a carboxylic acid, a carboxylic acid organotin compound, a sulfide organotin compound, a mercaptide organotin compound, an organotin oxide, a reaction product of an organotin oxide and an ester, tetraethylenepentamine, triethylenediamine, potassium hydroxide and sodium hydroxide.

13. The thermosetting composition of claim 1, wherein said hydroxyl group-containing resin (A) is a polyester polyol.

14. The thermosetting composition of claim 1, wherein said hydroxyl group-containing resin (A) is a polyester polyol.

15. A thermosetting composition comprising:
(A) a hydroxyl group-containing resin having a hydroxyl value of 10 to 150 mg KOH/g and selected from the group consisting of an alkyd resin, an acrylic resin, an epoxy resin, a fluorocarbon resin, cellulose, a polyester polyol, a polyether polyol, and a polyurethane polyol;
(B) a hydrolyzable silyl group-containing polymer wherein the main chain of the polymer is at least one member of the group consisting of a vinyl polymer, a polyester polymer, a polyether polymer, and graft or block copolymer thereof;

(C) a hydrolyzable silicon compound, comprising at least one member of the group consisting of ethyl silicate and partially hydrolyzed condensates thereof; and (D) a curing catalyst, wherein said thermosetting composition is cured by a crosslinking mechanism which comprises a crosslinking reaction between the hydroxyl group of the hydroxyl-group containing resin (A) and the hydrolyzable silyl group of the hydrolyzable silyl group-containing polymer (B).

* * * * *